United States Patent [19]

Tamashiro

[11] 4,246,828
[45] Jan. 27, 1981

[54] BLIND FASTENER

[75] Inventor: Emory K. Tamashiro, Harbor City, Calif.

[73] Assignee: Monogram Industries, Inc., Santa Monica, Calif.

[21] Appl. No.: 60,131

[22] Filed: Jul. 24, 1979

Related U.S. Application Data

[63] Continuation of Ser. No. 887,958, Mar. 20, 1978, abandoned.

[51] Int. Cl.³ .............................................. F16B 13/04
[52] U.S. Cl. ...................................................... 411/45
[58] Field of Search ............................ 85/7, 72, 77, 78

[56] References Cited

U.S. PATENT DOCUMENTS

| | | | |
|---|---|---|---|
| 2,372,222 | 3/1945 | Mullgardt | 85/78 |
| 2,397,111 | 3/1946 | Huck | 85/72 |
| 2,466,811 | 4/1949 | Huck | 85/78 X |
| 2,531,270 | 11/1950 | Hood | 85/78 |
| 2,765,699 | 10/1956 | La Torre | 85/72 |
| 3,148,578 | 9/1964 | Gapp | 85/77 |
| 3,215,024 | 11/1965 | Brilmyer et al. | 85/7 |
| 3,371,572 | 3/1968 | King | 85/7 |
| 3,377,907 | 4/1968 | Hurd | 85/78 |
| 3,377,908 | 4/1968 | Stau et al. | 85/78 |
| 3,515,419 | 6/1970 | Baugh | 85/78 X |
| 3,643,544 | 2/1972 | Massa | 85/72 |
| 3,685,391 | 8/1972 | Gapp et al. | 85/77 |
| 3,915,055 | 10/1975 | Binns | 85/77 |
| 4,012,984 | 3/1977 | Matuschek | 85/77 X |
| 4,089,249 | 5/1978 | Binns | 85/77 X |

Primary Examiner—Thomas J. Holko
Attorney, Agent, or Firm—Poms, Smith, Lande & Rose

[57] ABSTRACT

A blind fastener having a rivet sleeve, a core bolt, an expansible sleeve integral with the rivet sleeve, and a locking ring. The core bolt extends through the rivet sleeve and includes a sleeve expanding portion abutting against the sleeve with an enlarged stop ring at the end of the expanding portion. The ring encircles the core bolt and is disposed in a throughbore in the head of the rivet sleeve. The ring is split and has an internal chamfer for facilitating assembly regardless of irregularities on the core bolt. The core bolt has a stop thereon for preventing movement of the ring away from the head of the rivet sleeve toward a threaded portion of the core bolt.

5 Claims, 6 Drawing Figures

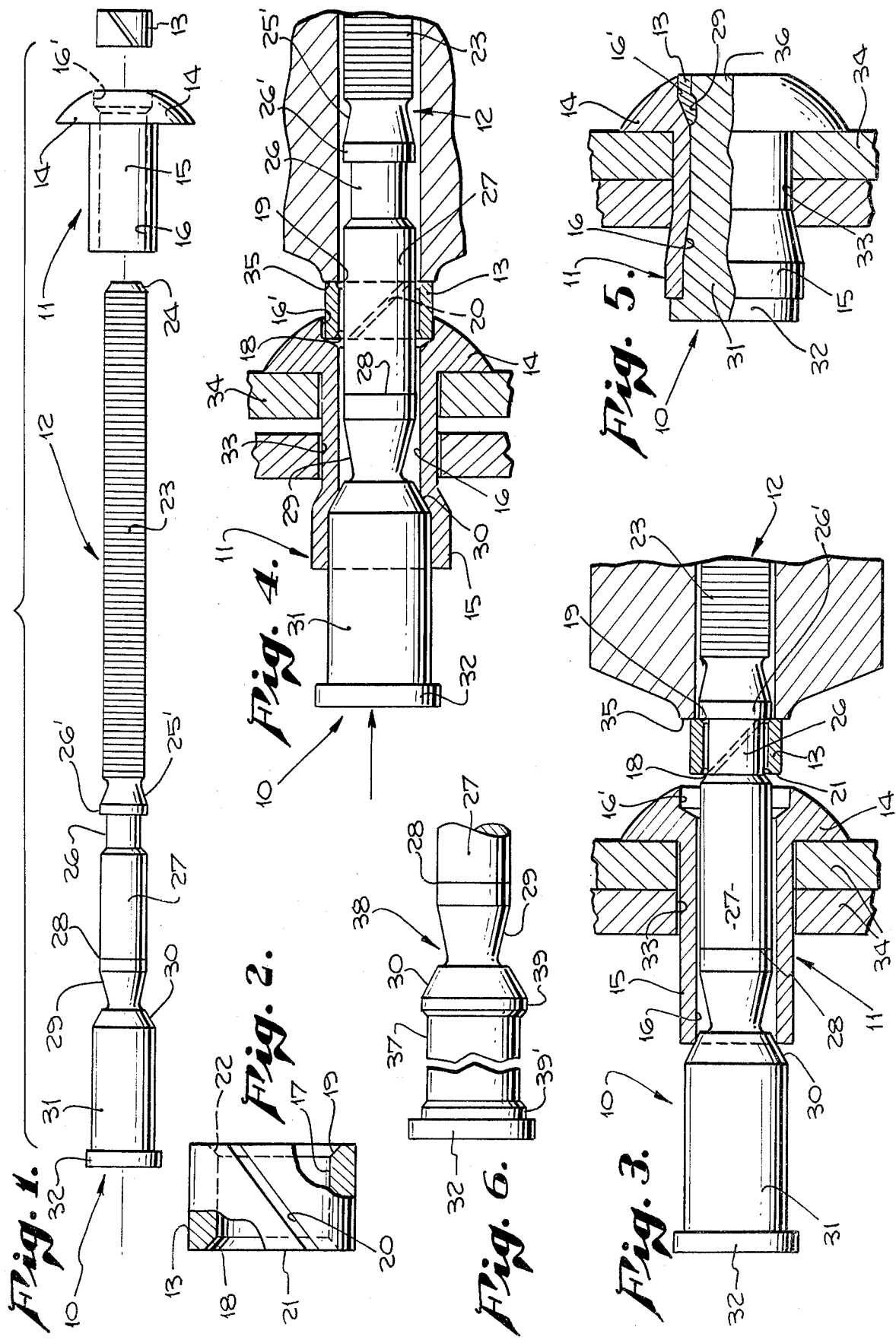

BLIND FASTENER

This is a continuation of application Ser. No. 887,958, filed Mar. 20, 1978, now abandoned.

BACKGROUND OF THE INVENTION

1. Field of the Invention

The invention relates to blind fasteners; and, more particularly, to a blind fastener having improved locking means.

2. Description of the Prior Art

Blind fasteners are known of a type having three pieces, a rivet sleeve, a headed core bolt and an expansible sleeve. The core bolt has a threaded shank with a breakneck portion separating the shank from a breakoff portion. The rivet sleeve has a head at one end to provide axial restraint on the driving side of two or more sheets and a tapered nose at its other end which extends beyond the blind side of the sheets. The sleeve is interposed between the nut's nose and the core bolt head. The fastener is set by rotating the core bolt with a driving tool engaged with the breakoff portion while holding the rivet sleeve in the sheets. The core bolt head is drawn inwardly towards the blind side of the sheets to expand the sleeve over the conical nose of the rivet sleeve to force the sleeve into compressive contact with the sheets. Upon reaching a predetermined torsional stress, the breakoff or driving portion of the core bolt severs from the shank at the breakneck groove. Axial restraint is provided in the set fastener by the expanded sleeve and the head of the rivet sleeve. This type of fastener is described in U.S. Pat. No. 2,765,699 to J. LaTorre.

Other fasteners known in the art, as the fasteners discussed in U.S. Pat. No. 3,643,544 to Massa and U.S. Pat. No. 2,531,270 to Hood, have a stop on the core bolt which abuts against the expansible sleeve and deform the sleeve in installing the fastener in a desired aperture. Certain prior art fasteners also have a locking sleeve or ring on the core bolt which enters the head of the rivet sleeve and serves to firmly lock the fastener in its installation hole, as for example, the ring 13 described and illustrated in U.S. Pat. No. 3,148,578. However, all of these fasteners have been found to be unsatisfactory in certain installations for one reason or another. These prior art fasteners require a close interaction between all the components so that the combination of friction, geometry and break-off diameter of the stem of the core bolt, during installation, is ideal. If tolerances are too excessive or metallurgical properties differ, or lubricants that are used are not consistent, these variable contribute to an inconsistent installation when the installation holes or grip thickness varies.

Most fasteners, as those in the aforementioned prior art, must break off at the same location regardless of grip condition. The fastener should expand within the installation hole so as to provide proper prestress of the drilled hole for resistance to fatigue or vibratory failures. This is accomplished by pulling the stem of the core bolt through the expansion sleeve where the stem diameter is larger than the inner diameter of the sleeve. As this stem pulls through, expansion of the sleeve is sufficient to provide the necessary installation hole-fill and the stem "necks down" or "wire draws" until the stem breaks off leaving the fastener in the fully installed condition (FIG. 4 of Hood, for example).

There is a need for a fastener which assures that it will install properly even under the worst conditions and that the stem never breaks prematurely. Much time is lost in the necessity of removing improperly installed rivets or fasteners. The fastener should be locked in its installation hole without the possibility of it becoming loose during use.

SUMMARY OF THE INVENTION

It is an object of this invention to provide a blind fastener which allows the breakneck dimension to be set at a minimum value to assure proper installation under all conditions.

It is a further object of this invention to provide a blind fastener which cannot break off prematurely.

It is still another object of this invention to provide a blink fastener having lock ring means which firmly locks the fastener in an installation hole and cannot pop out.

These and other objects are preferably accomplished by providing blind fastener which includes a rivet sleeve, a core bolt, an expansible sleeve integral with the rivet sleeve and a locking ring. The core bolt extends through the rivet sleeve and includes a sleeve expanding portion abutting against the sleeve with an enlarged stop ring at the end of the expanding portion. The ring encircles the core bolt and is disposed in a throughbore in the head of the rivet sleeve. The ring is split and has an internal chamfer for facilitating assembly regardless of irregularities on the core bolt. The core bolt has a stop thereon for preventing movement of the ring away from the head of the rivet sleeve toward a threaded portion of the core bolt.

BRIEF DESCRIPTION OF THE DRAWING

FIG. 1 is an exploded view of a blind fastener in accordance with the teachings of my invention;

FIG. 2 is a cross sectional view of one of the components of the fastener of FIG. 1;

FIG. 3 is a cross-sectional view of a first step in installing the fastener of FIG. 1 in an installation hole;

FIG. 4 is a cross-sectional view of a second step in installing the fastener of FIG. 1 in an installing hole (following the step illustrated in FIG. 3);

FIG. 5 is a cross-sectional view of the final installation of the fastener of FIGS. 1 through 4 in an installation hole; and FIG. 6 is a vertical view of a portion of a modified core bolt in accordance with the teachings of my invention.

DESCRIPTION OF THE PREFERRED EMBODIMENT

Referring now to FIG. 1 of the drawing, a blind fastener 10 is shown comprising a rivet sleeve 11, a core bolt 12 and a locking ring 13.

Rivet sleeve 11 includes a head 14, an integral expansion sleeve 15 and a throughnbore 16. Although a rivet sleeve of a particular configuration is disclosed, such as a domed head 14, the rivet sleeve can take various configurations known in the blind fastener art, such as having a flat head. Also, the expansion sleeve 15 can be any desired length and throughbore 16 can be any suitable diameter. The materials for rivet sleeve 11, and the remaining components of fastener 10, as well known in the art as can be seen by reference to the prior art discussed hereinabove and the fastener disclosed in U.S. Pat. No. 4,033,222, commonly assigned. For example, sleeve 15 (and the head 14, which may be integral therewith) may be of a suitable expansible material, such as stainless steel, aluminum, titanium alloy or a nickel-base alloy. Various suitable metals may be used in the remaining components.

As particularly contemplated in the present invention, lock ring means is provided for assuring the locking of core bolt 12 to nut 11 during installation. In the exemplary embodiment of the invention, such lock ring means includes the aforementioned ring 13 shown in detail in FIG. 2. Ring 13 is generally cylindrical with a throughbore 17 having a chamfered surface 18 leading into throughbore 17 and a chamfered surface 19 leading out of throughbore 17. Ring 13 is diagonally split along split 20, the split 20 extending at an angle from one end 21 of ring 13 to its other end 22. It can be seen in FIG. 2 that split 20 extends upwardly from end 21 to end 22 for reasons to be discussed. In other words, ring 13 is a split at an angle of less than 90°, such as 45°, inclined in a clockwise direction across the longitudinal extend of ring 13 progressively from one end to the other end thereof, as shown in FIG. 2. In its uncompressed state, the outer diameter of ring 13 is slightly less than the inner diameter of the throughbore 16' through the head of rivet sleeve 11 and of an overall length generally the same as the depth of that portion of the throughbore of rivet sleeve 11 through head 14.

Referring again to FIG. 1, core bolt 12 includes a pulling serration and roll-down section 23 having a plurality of annular serrations 23' having a roll-down lead-angle 24 at its nose or forward portion, tapered portion 25', a roll-up stop 26', an end spacer 26 for receiving ring 13 thereon, the roll-up stop 26' limiting the movement of ring 13, a spacer 27 (of greater diameter than end spacer 26), a breakneck section 28 leading into a lock-groove 29, a tapered transition section 30 leading to a sleeve expansion section 31, section 31 being greater in diameter than the inner diameter of throughbore 16 and terminating in stop ring 32, greater in diameter than section 31. As shown in FIG. 3, tapered transition section 30 has a constantly changing diameter having a portion thereon with an outer diameter the same as the inner diameter of throughbore 16 to facilitate entry of section 31 into sleeve 15. The diameter of the remaining section (other than section 31, 32) is slightly less than the diameter of throughbore 16 so that the core bolt 12 can be inserted into rivet sleeve 11 and ring 13, as will be discussed.

Referring now to FIGS. 3 and 4, fastener 10 is shown being installed in an installation hole 33 of a structure 34, which may be the skin of an aircraft or the like. Such skin has a reduced permanent deformation and hole 33 has a blind side and a driving side as discussed in the aforementioned prior art. The nose piece 35 of a conventional installation tool, which is well known in the blind fastener art, is shown engaging the section 23 of fastener 10, the core bolt 12 extending through the through-bore 16 of rivet sleeve 11 and ring 13, the ring 13 entering the through-bore of rivet sleeve 11 and desposed about spacer 26, roll-up stop 26' preventing movement of ring 13 toward position 23. The tapered or chamfered surface 18 of ring 13 facilitates entry of the bolt into the ring 13 (surface 19 being provided so that ring 13 may be used in either position during assembly). The installation tool begins pulling fastener 10 from the driving side in the direction of the arrow. Spacer 27 passes easily into throughbore 16' with tapered portion 30 facilitating movement into sleeve 15. Sleeve 15, as shown in FIG. 4, begins to expand when section 31, larger in diameter, enters throughbore 16 thus filling the hole 33 about fastener 10.

As shown in FIG. 5, pulling with the tool is continued in the direction of the arrow until stop ring 32 engages the rear of sleeve 15 whereby the core bolt 12 breaks at groove 29 as shown in FIG. 5. The breakneck area 36 indicates where groove 29 breaks and the lock ring 13 is firmly locked about area 36 in the head 14 of rivet sleeve 11.

The chamfered surface 18 provides a controlled entry of the ring 13 into the throughbore of rivet sleeve 11. If there are any discontinuities along the surfaces of the core bolt 12, and there usually are due to how such core bolts are fabricated, the chamfered surface 18 will compensate for any flashes or burrs remaining after manufacture of the core bolt.

The final assembly illustrated in FIG. 5 shows that the fastener 10 is set properly, stop ring 32 permitting stem breakout at area 36 which not only is proper but sets the lock ring 13 properly in the bolt head 14. Even under the worst conditions, the fastener 10 will install properly. The stop ring 32 provides a positive stop should the core bolt overdrive.

In the instant fastener described, as the core bolt 12 is wire-drawn into sleeve 15, as seen in FIG. 4, when locking ring 13 moves into and about portion 29 as the bolt 12 is drawn in the direction of the arrow, the forward facing end of ring 13 (i.e., facing in the direction opposite that of the arrow or to the left in FIG. 4) engages and abuts against the transition radius leading to tapered portion 30 stopping movement at the initiation of wire drawing; there is thus no place for locking ring 13 to go except into the cavity 16' in head 14. When locking groove 29 becomes even with cavity 16' (i.e., as seen in final assembly in FIG. 5), ring 13 now has a place it can go, i.e., into the space between groove 29 and the inner wall 16 of sleeve 15. It abuts against the transition radius between groove 29 and tapered portion 30.

As mentioned hereinabove, in its uncompressed state, the outer diameter of ring 13 is slightly less than the inner diameter of throughbore 16'. As it is moved along spacer 27 and breakneck 28, it is obviously under compression due to the tight fit and the forces acting thereon. There is a tendency of the ring 13 to scrape along the core bolt and dig into the spacer 27 and breakneck 28. However, since ring 13 is chamfered at 18, such digging in is minimized.

As the total structure thickness increases (FIGS. 3 and 4), the installation pulling load on fastener 10 increases due to friction. In order to reduce friction without sacrificing any mechanical properties of fastener 10, section 30 of the fastener 10 of FIG. 1 may be modified as shown in FIG. 6. Thus, section 37 of core bolt 38 is reduced with sections 39 and 39' being relatively the same diameter as section 30 of bolt 12 of FIG. 1. Thus, due to the diameter of sections 39, 39', the core bolt 38 (otherwise identical to core bolt 12 of FIG. 1 with like numerals referring to like parts), the bearing surface at the initial stage of installation (FIG. 3) remains unchanged. As the core bolt 38 pulls through and wire draws, reduced section 37 provides a relief in the pulling load where friction begins to increase. The amount of reduction of section 37 may be varied depending upon the hardness of the material of the core bolt and the length of the portion of the core to bolt to be wire drawn. The use of the core bolt 38 of FIG. 6 results in an improved ease of installation without any loss of the necessary mechanical properties of the core bolt 38.

After installation, as shown in FIG. 5, the head 14 of the fastener 10 is milled down with a rotating milling tool to remove any rough edges, as for example, protruding portions of ring 13. Since the ring 13 is slit as previously disclosed, the rotation of the milling tool is in the same direction as the slit 20 so that the milling tool cannot engage the sharp edges adjacent the slit 20 and pop the ring 13 out of head 14.

TESTS

Tests were run on blind fasteners manufactured in accordance with the teachings of the invention. These blind fasteners were found to exceed the National Aerospace Standard (NAS) requirements for fasteners of this type in tension, shear, fatigue, hole-fill, clamp-up, spindle retention, vibration resistance and un-installed push-out resistance. Due to the unique locking feature of my invention, the fasteners exhibited high rates of correct installation due to consistent flush break-off performance.

The locking ring or collar 13 is inserted automatically during installation. The stems of the fasteners tested were found to lock more securely than required by NAS specifications due to the improved design of collar or ring 13. Such collar or ring 13 seats tightly around the portion 29 (FIG. 5) eliminating the possibility of movement of the stem portion 31 and provides high resistance to vibration, particularly under sonic loads.

The collar or ring 13 was found to lock the stem completely at precisely the correct point during the stem pulling operation. This is due to a high locking force being applied to the stem at exactly the right moment during pull-out so that flush break-off occurs with exceptional consistency.

I claim:

1. In a blind fastener having a rivet sleeve, said rivet sleeve including a head and an integral expansive sleeve, both said head and said expansive sleeve having inter-connected throughbores extending therethrough, a core bolt having a serrated shaft portion generally the same diameter as said throughbores, a smooth-walled portion extending from said serrated shaft portion generally the same diameter as said throughbores, a breakneck groove interconnecting th smooth walled portion with a second smooth-walled portion having at least a portion thereof of a diameter greater than said first mentioned smooth-walled portion, said rivet sleeve being mounted on the first-mentioned smooth-walled portion with said expansive sleeve extending away from said head, and a locking ring having a throughbore for receiving said core bolt therethrough, the outer diameter of said locking ring being substantially the same as the diameter of the throughbore in the head of said rivet sleeve and disposed therein and about said core bolt between said first-mentioned smooth-walled portion and said serrated threaded shaft portion said locking ring being under compression when said core bolt is being pulled into said rivet sleeve and abutting against a portion of said rivet sleeve, the improvement which comprises:

said locking ring being independent of said rivet sleeve, and being generally cylindrical and having a smooth-walled outer cylindrical surface and a smooth-walled cylindrical throughbore, the inner wall of said locking ring being chamfered in a direction leading into said throughbore of said locking ring, said locking ring being split at an angle of less than 90° inclined in a clockwise direction across the longitudinal extent of the ring progressively from one end to the other end thereof, said core bolt having a tapered portion extending from said breakneck groove to said second smooth-walled portion, said locking ring entering the throughbore in the head of said rivet sleeve; and the end of said locking ring facing in the direction opposite the direction of movement of said core bolt during assembly abutting against said tapered portion extending from said breakneck groove to said second smooth-walled portion.

2. In the fastener of claim 1 wherein said lock ring is disposed on said core bolt on a smooth-walled portion thereof, slightly less in diameter than the remainder of said first-mentioned smooth-walled portion, and a roll-up stop on said core bolt at the junction of said first-mentioned smooth-walled portion and said serrated portion for limiting the movement of said lock ring away from said rivet sleeve to said serrated portion.

3. In the fastener of claim 1 wherein the width of said lock ring is substantially the same as the width of the portion of said throughbore in said rivet sleeve passing through the head thereof.

4. In the fastener of claim 1 wherein the overall length of said last-mentioned smooth-walled portion is substantially the same as the length of the throughbore of said rivet sleeve.

5. In the fastener of claim 1 wherein said last-mentioned smooth-walled portion includes a first portion having a diameter substantially the same as the diameter of the throughbore of said expansive sleeve to facilitate entry of said last-mentioned smooth-walled portion into said expansive sleeve and a main reduced portion extending from said at least a portion thereof of said last-mentioned smooth-walled portion to said stop ring, the diameter of said main reduced portion being of a diameter less than the diameter of said first portion, said smooth-walled portion including a second portion having a diameter substantially the same as the diameter of said throughbore of said expansive sleeve.

* * * * *